(12) United States Patent
Elmose

(10) Patent No.: US 10,900,470 B2
(45) Date of Patent: Jan. 26, 2021

(54) WIND TURBINE

(71) Applicant: SIEMENS GAMESA RENEWABLE ENERGY A/S, Brande (DK)

(72) Inventor: Soeren Forbech Elmose, Bording (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 19 days.

(21) Appl. No.: 16/120,644

(22) Filed: Sep. 4, 2018

(65) Prior Publication Data

US 2019/0072083 A1 Mar. 7, 2019

(30) Foreign Application Priority Data

Sep. 7, 2017 (EP) .................................... 17189895

(51) Int. Cl.
*F03D 1/06* (2006.01)
*F03D 80/70* (2016.01)

(52) U.S. Cl.
CPC ............ *F03D 80/70* (2016.05); *F03D 1/0658* (2013.01); *F05B 2220/30* (2013.01); *F05B 2220/706* (2013.01); *F05B 2240/221* (2013.01); *F05B 2240/50* (2013.01); *F05B 2260/74* (2013.01); *F05B 2260/79* (2013.01)

(58) Field of Classification Search
CPC ...... F03D 1/0658; F03D 1/0625; F03D 1/066; F03D 80/70; F05B 2240/50; F05B 2220/30; F16C 2360/31; F16C 2360/231; F16C 19/08; F16C 19/18; F16C 33/58; F16C 33/583; F16C 35/06; F16C 35/067
See application file for complete search history.

(56) References Cited

U.S. PATENT DOCUMENTS

| 6,616,338 | B2 * | 9/2003 | Tibbits ................... F16C 33/58 384/447 |
| 6,991,378 | B2 * | 1/2006 | Jacquemont ........ F16C 33/6607 384/471 |
| 8,322,928 | B2 * | 12/2012 | Larsen .................. F03D 7/0224 290/55 |
| 2009/0311104 | A1 | 12/2009 | Steffensen |
| 2013/0052023 | A1 | 2/2013 | Larsen et al. |
| 2013/0177419 | A1 * | 7/2013 | Zaehr ................... F03D 7/0224 416/23 |

FOREIGN PATENT DOCUMENTS

| CN | 101403367 A | 4/2009 |
| CN | 101617120 A | 12/2009 |
| EP | 2630368 A1 | 8/2013 |

OTHER PUBLICATIONS

European Extended Search Report dated Mar. 14, 2018 for Application No. 17189895.0.
Non-English Chinese Office Action dated Nov. 1, 2019 for Application No. 201811045322.2.

* cited by examiner

*Primary Examiner* — Kenneth J Hansen
*Assistant Examiner* — Maxime M Adjagbe
(74) *Attorney, Agent, or Firm* — Schmeiser, Olsen, & Watts LLP

(57) ABSTRACT

Provided is a wind turbine including a hub and several blades rotatably attached to the hub by means of blade bearings including an inner ring coupled with the respective blade and an outer ring coupled with the hub, or vice versa, and rolling elements provided between the rings, wherein the outer ring or the inner ring has a cross section with a circumferentially varying thickness.

5 Claims, 2 Drawing Sheets

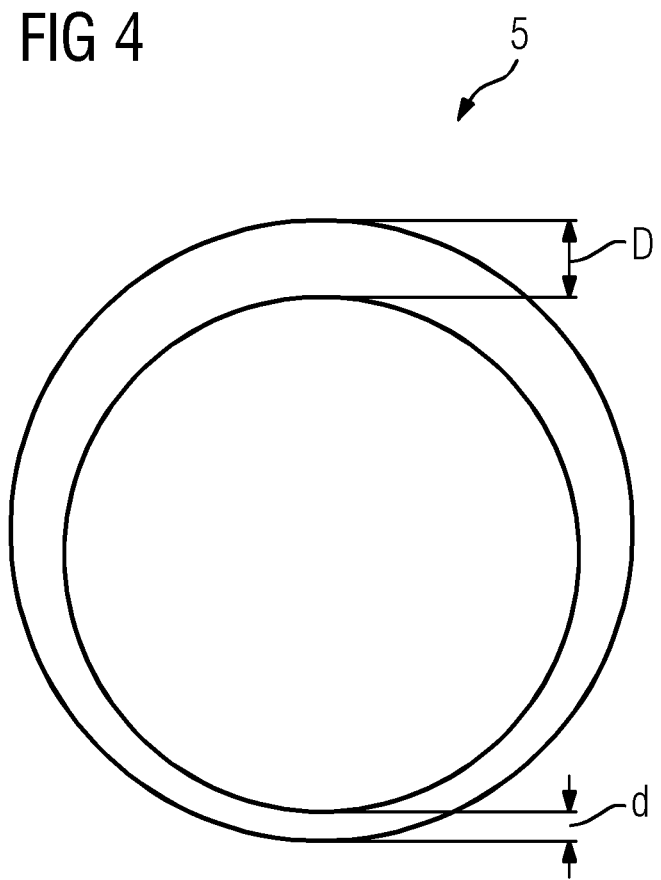

WIND TURBINE

CROSS-REFERENCE TO RELATED APPLICATIONS

This application claims priority to European Application No. 17189895.0 having a filing date of Sep. 7, 2017 the entire contents of which are hereby incorporated by reference.

FIELD OF TECHNOLOGY

The following relates to a wind turbine comprising a hub and several blades rotatable attached the hub by means of blade bearings comprising an inner ring coupled with the respective blade and an outer ring coupled with the hub, or vice versa, and rolling elements provided between the rings.

BACKGROUND

If wind impacts on the blades of the wind turbine the hub is rotated. This rotation is finally transferred to a power generator as commonly known. Usually the blades are rotatable attached to the hub by means of blade bearings allowing the respective blades to be pitched, for example depending on the wind force or the wind direction etc. Usually the nacelle arranged at the top of the turbine tower, which nacelle comprises the hub and the respective components, is directed against the wind, so that the blades are directly orientated towards the wind direction. When the wind blows large flap bending moments can occur, which bear the risk that the blade bearings can slightly open causing an unequal load distribution between the inner and the outer ring respectively the respective raceways provided at the inner and the outer ring, which will consequently reduce the lifetime of the bearing. Therefore, efforts are made to stiffen either the outer ring of the blade bearing by increasing the outer ring size and thereby increasing the stiffness and lowering the deformation of the outer ring. This increases the weight of the bearing and the amount of special steel from which the bearing rings are built, for example 42CrMo4. Another approach is to increase the stiffness of the hub by adding material further away from the location of interest, but also this approach leads to adding additional material and thereby increasing the weight.

SUMMARY

An aspect relates to an approved wind turbine.

For solving the problem, a wind turbine as mentioned above is characterised in that the outer ring or the inner ring has a cross section with a circumferentially varying thickness.

The outer ring or the inner ring of the inventive blade bearing has a circumferentially varying thickness. For example, is the bore of the outer ring, in which the inner ring is arranged, approximated eccentrical to the centre of the outer ring, which may have either a circular circumference or a slightly oval circumference. Therefore, the inner ring is approximated eccentrical to the outer ring. This varying thickness of the outer ring allows the bearing to be sufficiently stiff to support itself in the region which needs to be stiffened due to the loads resting on the bearing resulting from the wind force. On the other hand, the bearing is thin enough in the region where the hub is stiff and the load is lower. So, the setup of the outer ring respectively the bearing is chosen depending on the load distribution at the hub resulting from the wind force acting on the blades respectively the bearing and the hub. This allows for increasing the stiffness of the outer ring and therefore the overall bearing in a region or location of high load and softer companion or surrounding structure, i.e. the hub, without adding additional material in lower loaded locations or regions.

As an alternative the bore of the inner ring can be eccentrical while the bore of the outer ring is centered. Also, this embodiment shows the above depicted advantages.

The thickness itself varies constantly between a maximum and a minimum thickness. A ring with the inventive varying thickness, especially constantly varying between a maximum and a minimum thickness, is easily produced by means of actual forging techniques. It is possible to produce rings with widely varying sizes or diameters and therefore bearings for different blade or hub sizes. It is to be noted that the outer ring, the same as for the inner ring, can be a one-piece ring or can be made by several ring segments.

Preferably the outer ring or the inner ring is arranged such that the section showing the largest thickness is positioned towards the front side of the hub and the section with the smallest thickness is positioned towards the rear side of the hub. This means that the thickest section of the outer ring or the inner ring is directed towards the wind direction, while the smallest section of the ring is positioned to the opposite side. This arrangement is very advantageous in view of the real load distribution at the hub of current wind turbine setups.

In a further embodiment the hub comprises an attachment area with a surface having a geometry corresponding to the attachment side surface of the outer ring or the inner ring. As the surface area of the side surface of the outer ring or the inner ring varies in a circumferential direction due to the variation of the thickness of the outer ring or the inner ring in the circumferential direction it is advantageous if this surface geometry is also realized at the attachment area of the hub, to which the outer ring or the inner ring is attached by means of bolts or the like. This allows a perfect fixation and bearing of the outer ring or the inner ring at the hub.

The following also relates to a bearing for a wind turbine for attaching a blade to a hub, comprising an inner ring to be attached to the blade and an outer ring to be attached to the hub, or vice versa, with rolling elements being provided between the rings. This bearing is characterised in that the outer ring or the inner ring has a cross section with a circumferentially varying thickness.

This thickness preferably varies continuously between a maximum and a minimum thickness.

The bearing respectively the outer and the inner ring are certainly made of steel, preferably 42CrMo4, while this is not a conclusive example, as also other steels may be used.

BRIEF DESCRIPTION

Some of the embodiments will be described in detail, with references to the following figures, wherein like designations denote like members, wherein:

FIG. 4 shows a principal sketch of an outer ring of an alternative embodiment of a blade bearing.

DETAILED DESCRIPTION

Figure 1:
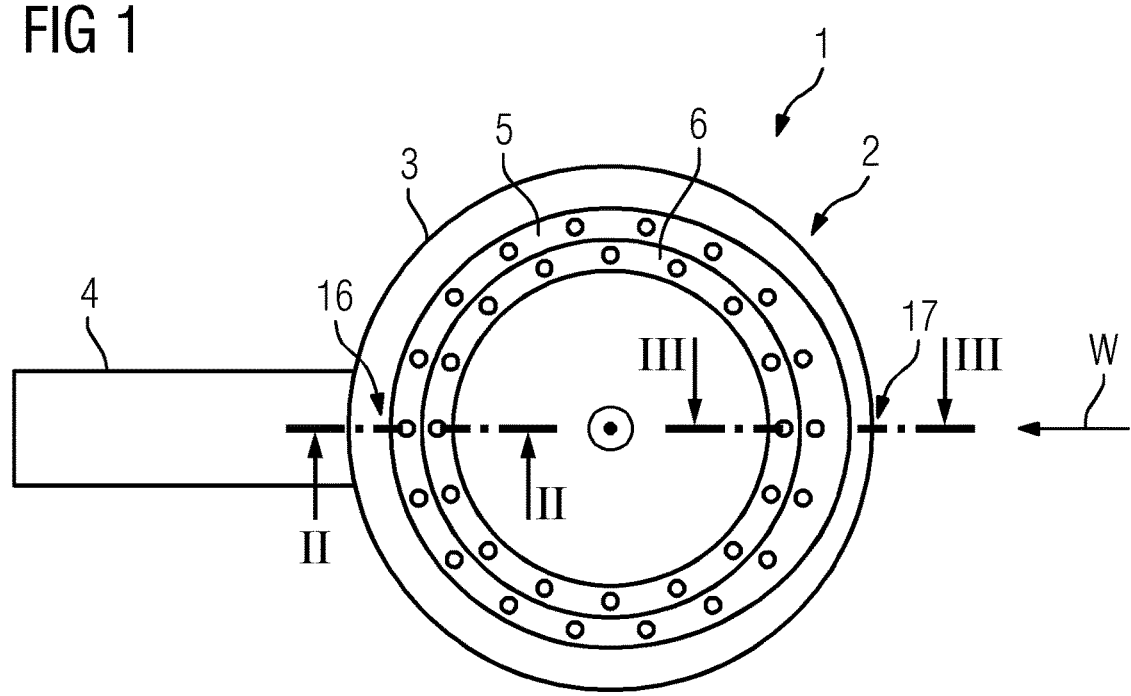
FIG. 1 shows a schematic partial view of a wind turbine with an embodiment of a blade bearing.

FIG. 1 shows a partial view of an inventive wind turbine 1 comprising an inventive blade bearing 2. FIG. 1 shows the hub 3 and a main shaft 4 transferring the rotation of the hub to a not shown power generator.

Usually the hub 3 comprises three blades which are attached to the hub by means of respective blade bearings 2 allowing the respective blade to be pitched if need be.

Each blade bearing 2 comprises an outer ring 5, in this example attached to the hub 3 and an inner ring 6 to which the blade is attached. The attachment area respectively the bearing area is shown in the respective cross sections shown in FIGS. 2 and 3. As these figures depict the outer ring 5 is attached to the hub 3 by means of respective bolts 7 extending through respective bores 8, 9 provided in the outer ring 5 and the hub 3. The side surface 10 of the outer ring 5 rests on a respective attachment area surface 11 of the hub 3.

The inner ring 6 is also attached by means of respective bolts 12 to the blade 13, of which only the blade root 14 is shown.

Figure 2:
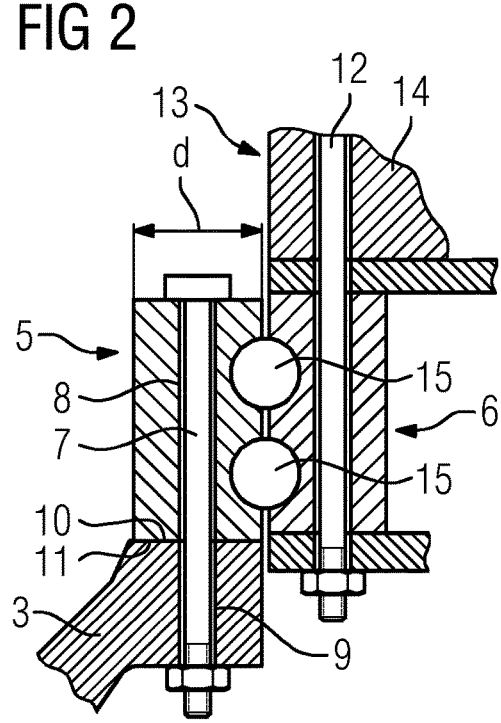
FIG. 2 shows a cross sectional view along the line II-II in FIG. 1
Figure 3:
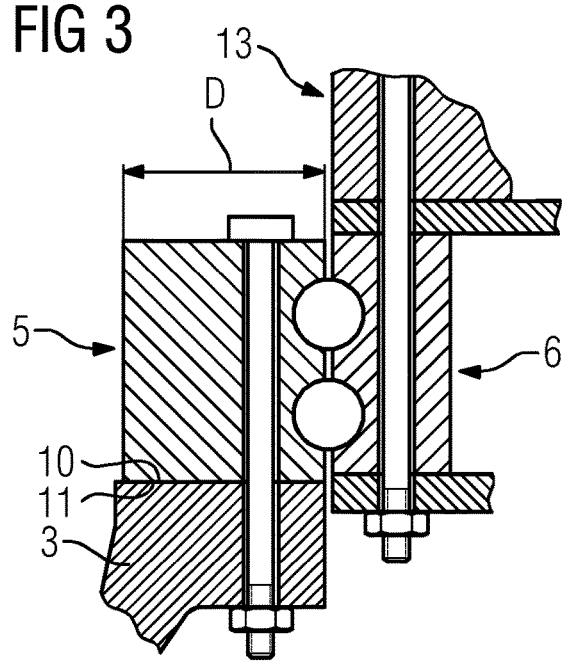
FIG. 3 shows a cross sectional view along the line III-III in FIG. 1.

As FIGS. 2 and 3 show respective roller elements 15 are provided between the outer ring 5 and the inner ring 6 running on respective raceways and allowing the rotation of the inner ring 6 relative to the not rotating outer ring 5, allowing the pitching of the blade 13.

As FIG. 1 shows the thickness of the outer ring 5 varies circumferentially. In a first region 16 the thickness of the outer ring 5 is smaller or shows a minimum thickness value. At the opposite side in the region 17 the thickness of the outer ring 5 is clearly larger and shows a maximum value. The minimum thickness in the region 16 is shown with the thickness d in FIG. 2, while the maximum thickness in the region 17 is shown with the thickness D in FIG. 3. As FIG. 1 clearly shows the region 17 is positioned at the front end of the hub towards the wind direction W, while the section 16 with the smaller thickness is directed towards the opposite side.

As FIG. 1 shows the region 16 with the small thickness may extend for about 180°. Then the thickness increases constantly to a maximum value. It is certainly also possible that the region 16 is smaller, so that the increase of the thickness may directly start at the minimum thickness position and increase constantly to the maximum thickness position at the opposite side of the outer ring 5.

The FIGS. 2 and 3 show respective cross sections taken along the lines II-II (FIG. 2) and III-III (FIG. 3).

As a comparison between FIGS. 2 and 3 clearly shows, the outer ring 5 shown in cross section has a varying thickness. The ring thickness is almost double the size at the region 17, compared to the region 16. This varying cross section allows the bearing to be sufficiently stiffed to support itself in the region which needs to be stiffened, i.e. at the front side of the hub while the bearing respectively the outer ring is thin enough where the hub is stiff enough and the load resting on this arrangement is lower.

As FIGS. 2 and 3 show also the hub geometry is chosen corresponding to the geometry of the outer ring 5. As a comparison of FIGS. 2 and 3 show also the attachment area surface 11 of the hub 3 shows a varying geometry, which in its extension corresponds to the geometry or extension of the outer ring 5, so that there is also a corresponding surface attachment between these two items.

Finally, as FIGS. 2 and 3 also show that the inner ring 6 has a constant thickness.

While, as depicted above, FIG. 1 shows an outer ring with a first section 16 extending for approximately 180° having the small constant thickness d, which then increases constantly in the section 17 to the maximum value D, FIG. 4 shows alternative embodiment of an outer ring of an inventive blade bearing 2. This outer ring is characterised in that the thickness of the ring 5 increases constantly along the circumference from the minimum value d to the maximum value D at the opposite ring side.

Independently of specific geometry of the outer ring 5 the above-mentioned makeups of the different versions of the outer ring 5 can be easily produced by means of current forging techniques. The respective outer ring 5 may be a one-piece ring or may be a segmented ring comprise several separate ring segments.

Alternatively, the inner ring can show the varying thickness. Further the attachment of the rings to the hub and the blade can be vice versa.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A wind turbine comprising:
   a hub;
   a plurality of blades rotatably attached to the hub by means of blade bearings comprising an inner ring coupled with a respective blade and an outer ring coupled with the hub, or vice versa, and rolling elements provided between the inner ring and the outer ring, wherein the outer ring or the inner ring has a cross section with a circumferentially varying thickness;
   wherein the outer ring or the inner ring is arranged such that a section with a largest thickness is positioned towards a front side of the hub and a section with a smallest thickness is positioned towards a rear side of the hub.

2. The wind turbine according to claim 1, wherein the circumferentially varying thickness varies continuously between a maximum thickness and a minimum thickness.

3. The wind turbine according to claim 1, wherein the hub comprises an attachment area with a surface having a geometry corresponding to an attachment side surface of the outer ring or the inner ring.

4. A bearing for a wind turbine for attaching a blade to a hub, comprising:
   an inner ring to be attached to the blade; and
   an outer ring to be attached to the hub, or vice versa, with rolling elements being provided between the inner ring and the outer ring;
   wherein the outer ring or the inner ring has a cross section with a circumferentially varying thickness;
   wherein the outer ring or the inner ring is arranged such that a section with a largest thickness is positioned towards a front side of the hub and a section with a smallest thickness is positioned towards a rear side of the hub.

5. The bearing according to claim 4, wherein the circumferentially varying thickness varies continuously between a maximum and a minimum thickness.

* * * * *